US007013356B2

(12) United States Patent
Moss

(10) Patent No.: US 7,013,356 B2
(45) Date of Patent: Mar. 14, 2006

(54) METHODS AND STRUCTURE FOR PRESERVING LOCK SIGNALS ON MULTIPLE BUSES COUPLED TO A MULTIPORTED DEVICE

(75) Inventor: Robert W. Moss, Longmont, CO (US)

(73) Assignee: LSI Logic Corporation, Milpitas, CA (US)

( * ) Notice: Subject to any disclaimer, the term of this patent is extended or adjusted under 35 U.S.C. 154(b) by 477 days.

(21) Appl. No.: 10/232,289

(22) Filed: Aug. 30, 2002

(65) Prior Publication Data

US 2004/0044813 A1 Mar. 4, 2004

(51) Int. Cl.
*G06F 12/00* (2006.01)

(52) U.S. Cl. ...................... 710/200; 711/149; 711/152; 710/108

(58) Field of Classification Search ................ 710/107, 710/108, 112, 313, 59; 711/147, 149, 150–153
See application file for complete search history.

(56) References Cited

U.S. PATENT DOCUMENTS 4,698,753 A * 10/1987 Hubbins et al. ............ 709/209
5,206,833 A * 4/1993 Lee ............................ 365/233
6,282,583 B1 * 8/2001 Pincus et al. ............... 713/375
6,442,642 B1 * 8/2002 Brooks ....................... 710/305

FOREIGN PATENT DOCUMENTS

EP 12016 A * 6/1980
JP 08006905 A * 1/1996

* cited by examiner

*Primary Examiner*—Tim Vo
*Assistant Examiner*—Clifford Knoll
(74) *Attorney, Agent, or Firm*—Duft Bornsen & Fishman, LLP

(57) ABSTRACT

Structure and methods for preserving lock requests by master devices on multiple buses each coupled to a port of a multiported device. The invention provides for arbitration among multiple ports of a multiported device to preserve the intent of a lock request to retain exclusive control of the bus over an extended period involving multiple bus transactions directed through a corresponding port. In a first exemplary preferred embodiment, an AMBA AHB compliant bus bridge or multiported slave device is coupled through its ports to multiple AHB buses each having one or more master devices coupled thereto. Logic circuits and methods associated with port arbitration for the bus bridge device or multiported slave device preserve the intent of HLOCK requests asserted by master devices on one of the AHB buses coupled to a port to preserve the intent of the lock request through port arbitration within the multiported device.

5 Claims, 5 Drawing Sheets

METHODS AND STRUCTURE FOR PRESERVING LOCK SIGNALS ON MULTIPLE BUSES COUPLED TO A MULTIPORTED DEVICE

BACKGROUND OF THE INVENTION

1. Field of the Invention

The present invention relates to bus arbitration and in particular relates to methods and structure associated with arbitration in a bus bridge or multiported slave device coupled to multiple buses for preserving lock signals generated by master's on multiple buses.

2. Discussion of Related Art

It is generally known in the digital electronics arts that multiple devices exchange information with one another over an electronic bus structure connecting the multiple devices. In general, a first device, typically referred to as a master device, initiates the exchange of information with a second device, typically referred to as a slave device. Where a particular bus architecture supports multiple master devices, it is generally known in the art that the bus structure and/or devices coupled thereto include arbitration features to select among multiple master devices simultaneously requesting use of the bus for exchange of information with one or more slave devices. Arbitration grants temporary exclusive control of the shared bus to one of multiple simultaneous requesting master devices on the bus. Arbitration, in general, is initiated by one or more master devices issuing a request for the shared bus indicating a need for temporary exclusive control of the bus. A bus grant signal corresponding to a requesting master device is eventually returned to the requesting master device by the arbitration logic (arbiter) indicating granting of the requested temporary exclusive control of the shared bus structure. The requesting master devices then performs the desired exchange of information with identified a slave devices and eventually relinquishes its temporary exclusive control of the bus by releasing its bus request signal or through other indicia appropriate to the particular bus structure. Arbitration logic of the bus structure is then free to receive further bus requests and grant temporary exclusive control of the shared bus to other requesting master devices. The sequence of requesting the bus, granting the bus, exchanging desired information over the bus and relinquishing control of the bus is often referred to as a "transaction" or "bus transaction."

Similar arbitration considerations also apply to systems where multiple buses are coupled together through a device usually referred to as a "bus bridge." Still further, there are slave devices that are multi-ported such that the device itself is capable of being coupled directly to multiple buses. For example, a memory controller may be such a multi-ported slave device. The memory controller may attach to a plurality of buses, each bus having one or more master devices coupled thereto for purposes of exchanging information with the memory devices managed by the memory controller. The various master devices each initiate bus transactions to exchange data with the memory devices through the slave memory controller.

In some bus architectures, it is common for master devices to assert a lock signal indicating that the particular sequence of transactions being performed is to exclude other requests through the entire sequence of transactions. Where normally an arbitration element will grant a new request to another requesting master device as soon as an earlier bus transaction completes, the lock protocol indicates that the bus is to be retained by the current master device until an entire sequence of transactions is completed. For example, such locking protocols and structures are common where a master device requires temporary exclusive control of a slave device for purposes of performing a read-modify-write sequence of bus transaction. Such a sequence of transactions requires that the master device and slave device(s) remain in communication through multiple bus transactions where a value is read (returned to the master), modified by the master device and returned to the slave (written back to the slave) all as an atomic, uninterrupted sequence of bus transactions. In such a sequence it may be critical that the slave device exchange information exclusively with a single bus master regardless of the number of buses coupled to the slave device or coupled to a bus bridge device. A lock is used to assure such atomicity for a sequence of related bus transactions.

It is presently a problem in the art to preserve such locking bus requests where multiple buses are coupled to one or more slave devices through a bus bridge or coupled to a multiported slave device. In one particular exemplary system, an AMBA AHB bus architecture supports multiple AHB buses to be coupled through a common bus bridge or to be coupled to a multiported slave device. Such techniques and structures are supported in for example, AHB, AHB-Lite and Multilayer AHB bus architectures.

In general, in such architectures, each bus is coupled to the bus bridge or multiported slave device through a "port" of the bridge or multiported device. The bridge or multiported device therefore has multiple ports from which it selects a next port for transactions with the common, shared device. As used herein, "multiported device" or "multiported slave device" refers to any multiported device including, for example, a bus bridge circuit and a multiported slave device such as a memory controller having multiple ports for access to the shared memory.

Each bus coupled to a multiported device includes features to arbitrate for temporary exclusive control of the bus among the various master devices coupled to the bus. This bus arbitration selects a next requesting master device to receive temporary exclusive control of the corresponding bus. In turn, each bus is coupled to a port of the multiported device and requests access to the multiported device. The multiported device in like manner arbitrates among its various ports to select a next bus on which a master device is requesting access to the shared, multiported device. Arbitration techniques to select a port within the multiported device are similar to those used by each bus coupled to the multiported device.

In some bus architectures a device may request that its control of the bus be locked over a sequence of related bus transactions. For example, in the context of an AMBA AHB bus application, an AHB master device coupled to an AHB bus generates and HLOCK signal propagated onto its AHB bus as an HMASTLOCK signal when the arbiter of the particular AHB bus grants access to the requesting master device. The AHB arbiter on a particular AHB bus must allow a master device asserting the HLOCK signal to maintain ownership of the bus after exclusive ownership has been granted even when the master device is issuing idle transactions (i.e., no present data transaction for the bus).

The present specifications of such buses address the locking of a single bus by a master device on that bus. When multiple buses are attached to corresponding ports of a shared multiported device, there is no mechanism presently known which preserves the intent of such a lock signal of each of the multiple buses when arbitrating among the ports of the multiported device to process commands issued by master devices on each of the multiple buses.

It is evident from the above discussion that a need exists for an improved architecture for preserving the semantic intent of a locked sequence of bus transactions directed to a multiported device with multiple buses each coupled to a port of the multiported device.

SUMMARY OF THE INVENTION

The present invention solves the above and other problems, thereby advancing the state of the useful arts, by providing structure and associated methods for preserving the semantic intent of a lock signal asserted by a master device on one bus of multiple buses coupled to the ports of a multiported device. In particular, in one exemplary preferred embodiment of the present invention, an HLOCK signal asserted by an AHB master device propagated as HMASTLOCK on a first AHB bus coupled to a port of a multiported device causes circuits and methods of the present invention to preserve the intent of the HMASTLOCK signal by preventing selection of another port by the multiported device's port arbitration logic. Logic and methods within the structure of the present invention arbitrate among the multiple ports of the multi ported device while preserving the lock signal assertions by master devices on any of the buses coupled to ports of the multiported device.

The present invention is particularly useful in applications of multiple AMBA AHB buses coupled to an AHB bus bridge or an AHB compliant multiported slave device such as a multiported memory controller. The invention is also applicable to other bus architectures where multiple buses may be coupled through a bus bridge or multiported slave device and may assert a lock signal on behalf of a requesting master device, for example, during idle transactions of a sequence of locked transactions or, for example, during sequences of multiple write or read operations.

In another optional enhancement of the invention, interface command buffer circuits can be included in the port interface for each port of the multiported slave device. The interface command buffer associated with each port may buffer bus transactions from a corresponding bus on its bus interface while the multiported device is locked on another port by another bus thereby precluding port arbitration to select the port coupled to the first bus. When the multiported device is eventually unlocked and a next port selected by the port arbitration of the multiported device, the buffered transactions may by forwarded to the corresponding port of the multiported device. Bus transactions on the bus associated with the bus interface command buffer may therefore proceed to completion storing the relevant information in the command buffer. Thus, system utilization is improved by freeing other buses to generate new transactions (to be buffered) while another port of the multiported device has locked out access to the multiported device by other buses to other ports of the multiported device.

A first feature of the invention therefore provides an enhanced port arbitration circuit associated with a multiported slave device coupled to a plurality of buses wherein each bus has at least one master device coupled thereto, the enhanced port arbitration circuit including: a lock request detector for detecting a lock request from a master device on a first bus of said multiple buses coupled to a first port of said multiported slave device; and a lock preserver coupled to said lock request detector for preserving said lock request with respect to other ports of said multiported slave device.

Another aspect of the present invention further provides that said lock preserver includes: a state machine operable to control arbitration among said other ports in accordance with the preserved lock request on said first port.

Another aspect of the present invention further provides that said state machine is operable to prevent arbitration on said other ports while the preserved lock request remains active and wherein said state machine is operable to allow arbitration among said other ports when the preserved lock request in no longer active.

Another aspect of the present invention further provides that said multiported slave device is a memory controller.

Another aspect of the present invention further provides that the lock request detector includes: a lock request signal detector for detecting a lock request signal generated by said master device.

Another feature of the invention provides for a system comprising: multiple buses; multiple master devices each connected to a bus of said multiple buses; and a multiported slave device having a plurality of ports operably coupled to said multiple buses for processing bus transactions initiated by said multiple master devices wherein said multiported slave device includes: a port arbiter for determining a selected port of said plurality of ports to grant temporary exclusive access to said multiported slave device by a requesting master device of said multiple master devices coupled to a first bus of said multiple buses through said selected port for purposes of performing a bus transaction; and a lock grant control circuit, operably coupled to said port arbiter for preserving temporary exclusive access to said multiported slave device over multiple bus transactions by said master device by preventing said port arbiter from selecting other ports of said plurality of ports.

Another aspect of the present invention further provides that the lock grant control circuit includes: a lock detector for detecting a lock request signal generated by said requesting master device; and a lock preserver for preserving said lock request to preclude said port arbiter from selecting another port in response to detection of said lock request signal until said lock request signal is released by said requesting master device.

Another aspect of the present invention further provides for multiple bus interface command buffers wherein each bus interface command buffer is coupled between a port of said multiported slave device and a corresponding bus of said multiple buses for storing signals generated by master devices on each said corresponding bus and for applying the stored signals to a corresponding port of said multiported slave device.

Another aspect of the present invention further provides that each bus interface command buffer includes: buffers for storing bus transactions generated by said master devices on said each corresponding bus wherein said each interface command buffer is operable to apply the stored bus transactions to said port when a grant of temporary exclusive access is detected for said corresponding bus following release of said lock request by said requesting master device.

Another feature of the present invention provides a method in a system including a multiported slave device having multiple ports coupled through a port arbiter to multiple buses each having multiple master devices, a method for preserving lock requests for multiple transactions comprising the steps of: sensing a bus request by a requesting master device coupled to a corresponding bus requesting temporary exclusive access to said multiported slave device; granting said temporary exclusive to said requesting master device; sensing assertion of a lock request by said requesting master device; preventing said bus arbiter from granting other bus requests from other master devices on other buses of said multiple buses in response to sensing of assertion of said lock request; sensing de-assertion of said lock request by said requesting master device; and resuming normal operation of said bus arbiter to grant said other bus requests in response to sensing de-assertion of said lock request.

Another aspect of the present invention further provides that the step of sensing said bus request comprises the step of sensing assertion of a bus request signal generated by said requesting master device; and wherein the step of sensing said lock request comprises the step of sensing assertion of a lock request signal generated by said requesting master device.

Another aspect of the present invention further provides that the step of sensing de-assertion of said lock request comprises the step of: sensing the de-assertion of both said bus request signal and said lock request signal.

Another aspect of the present invention further provides the step of: buffering bus transactions generated by said other master devices on said other buses while said lock request is asserted.

Another aspect of the present invention further provides the step of: forwarding buffered bus transactions to a corresponding port of said multiported slave device in response to sensing de-assertion of said lock request.

DETAILED DESCRIPTION OF THE PREFERRED EMBODIMENTS

Figure 1:
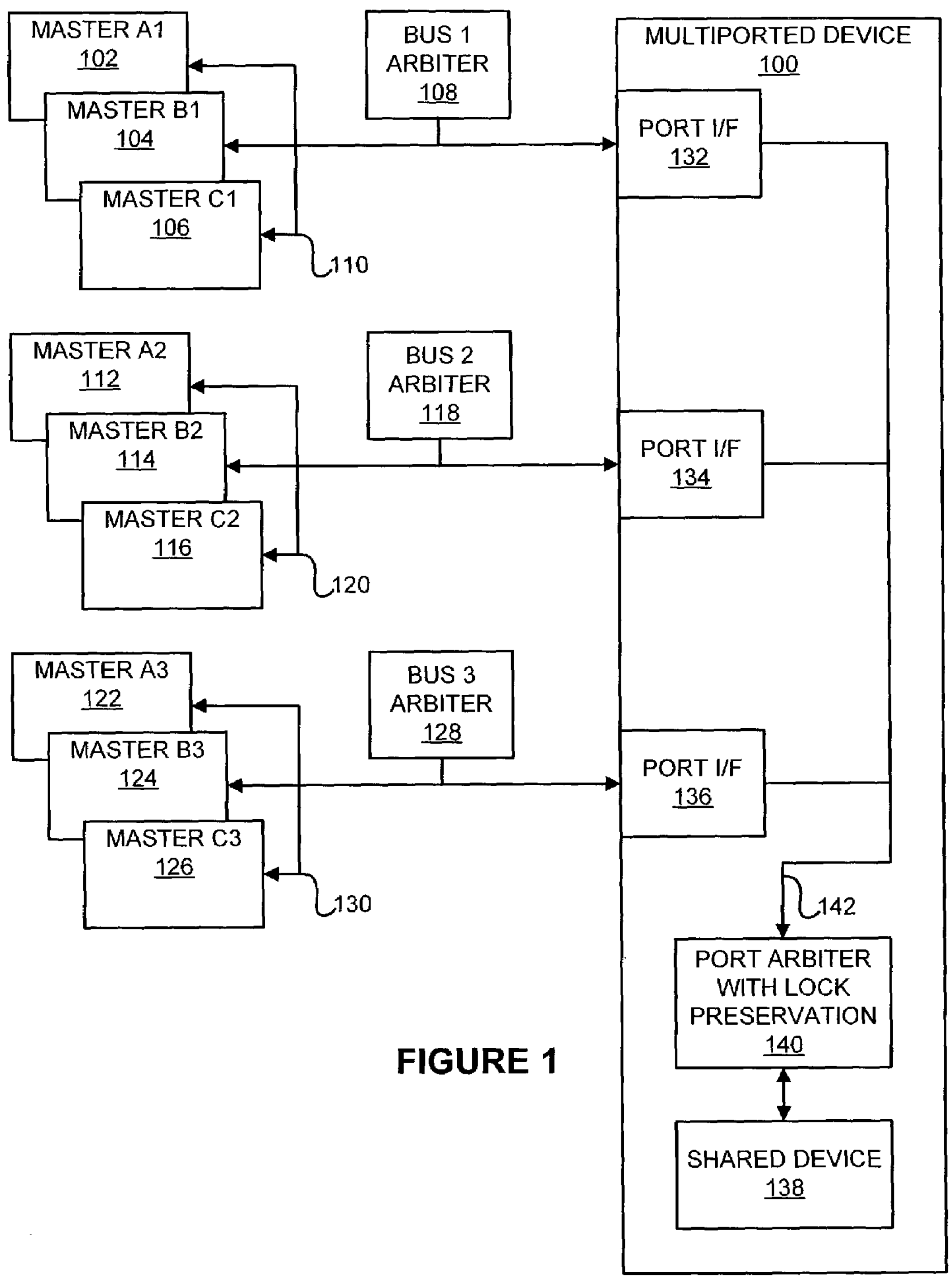
FIG. 1 is a block diagram of a system with lock preservation enhancements in port arbitration of a multiported device in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram depicting a system including a multiported device 100 enhanced in accordance with the present invention to provide for lock preservation during port arbitration within the multiported device. Multiported device 100 may include a plurality of port interfaces 132, 134 and 136 coupled to corresponding buses 110, 120 and 130. Bus arbiters 108, 118 and 128 are also coupled to buses 110, 120 and 130, respectively, and coordinate access by associated master devices to buses 110, 120 and 130, respectively. Each bus may include a plurality of master devices coupled thereto. For example, bus 110 shows master A1 (102), master B1 (104) and master C1 (106) all coupled to bus 110. Likewise, master devices A2 (112), B2 (114) and C2 (116) are coupled to bus 120 and master devices A3 (122), B3 (124) and C3 (126) are coupled to bus 130. The various master devices issue requests for access to shared device 138 within multiported device 100. Corresponding bus arbitration logic (108, 118 and 128) arbitrates among the various master devices coupled to its corresponding bus and presents an outstanding request to multiported device 100 through its corresponding port interface 132, 134 or 136. Within multiported device 100, port arbiter (with lock preservation) element 140 selects among presently outstanding requests presented at any of the port interfaces 132, 134 and 136 via signal path 142. A request from a selected port is then applied to shared device 138 for processing of the request generated by the corresponding master device. Upon completion of processing the request, port arbiter 140 may select another outstanding request present on a port interface corresponding to one of the plurality of buses coupled thereto.

In particular, port arbiter 140 includes features in accordance with the present invention to preserve the semantic intent of a lock request generated by a master device through one of the port interfaces. As noted above, some bus structures include features to lock a bus by a requesting master device to preclude arbitration on that bus from selecting another master device during a sequence of transactions by the first device. The start and end of the sequence of transactions is typically demarked by the assertion and deassertion of a lock signal by the master device presently using the corresponding bus. When the first device relinquishes its granted the lock request, other devices generating requests for the bus may be granted temporary exclusive control of the bus by the bus arbiter circuit corresponding to that bus.

Such a lock request is preserved within multiported device 100 in accordance with the present invention to preclude port arbiter 140 from selecting another port while a request on a first port (a locked port) is processed that requires a lock during a sequence of related transactions. Details of the structure and operation of port arbiter 140 with lock preservation enhancements are presented further herein below.

Those of ordinary skill in the art will recognize that they structure of FIG. 1 is intended merely as exemplary of numerous equivalent system structures where multiple devices coupled through multiple buses and multiple ports of a multiported device may request access to a shared device while preserving lock request protocols through the multiported device. Any number of master devices may be coupled to any number of buses. And any number of ports may be present in the multiported device each coupled to a corresponding bus and corresponding set of master devices.

Further, those of ordinary skill in the art will readily recognize that multiported device 100 in may be coupled through its port interfaces to discrete master devices as well as entire bus sub-structures as depicted in FIG. 1. Any collection of devices and/or buses requesting access to the shared device 138 within multiported device 100 may be used in conjunction with the structures and methods of the present invention for preserving lock request.

Those of ordinary skill in the art will also readily recognize that multiported device 100 may be any of several types of devices or structures capable of interacting with multiple bus structures. For example, multiported device 100 may be a slave device adapted with multiple ports allowing access by multiple master devices on multiple bus structures each coupled to a corresponding port of the multiported device. Further, multiported device 100 may be a bus bridge device adapted to receive bus transactions on multiple ports from corresponding multiple bus structures and exchange the bus transactions with another bus structure coupled to the bus bridge. Still further, multiported device 100 may simply be another bus structure directly coupled to multiple other buses and capable of receiving bus transactions on multiple ports from multiple other bus structures and performing corresponding transactions on the multiported bus structure. Shared device 138 represents all such devices to which access may be shared by a plurality of master devices and/or buses and to which controlled access is granted by the control structures of multiported device 100.

In one particular exemplary preferred embodiment, multiported device 100 may be a memory controller device capable of receiving memory request bus transactions from multiple bus structures and coordinating the multiple transactions with a shared memory subsystem (not shown) coupled to the memory controller.

Those of ordinary skill in the art will also recognize that numerous bus architectures and structures may benefit from the architecture depicted in FIG. 1. AMBA AHB bus architectures are exemplary of one bus structure that may benefit from the lock preservation of the present invention. In general, any bus structure (commercial standard buses or custom application buses) that permits locking of a bus over a sequence of multiple, discrete transactions may benefit from the lock preservation features of the present invention where multiple buses are coupled to a common shared resource—i.e., a multiported slave device.

In a simple implementation, port interfaces 132–136 merely provide signal buffering to isolate the multiported slave device 100 from the signals paths of the various buses coupled thereto. In a more typical implementation of the structure and in accordance with the best presently known mode of practicing the invention, bus interface and command buffers 132–136 may each include buffer memory (i.e., register sets) to buffer bus transactions generated on the corresponding bus while another bus has locked access to the multiported device. Bus transactions so buffered may be completed on the corresponding bus structure (110, 120 and 130) and for the requesting master device. When the granted bus lock is eventually released, the buffered bus transaction may be forwarded from the command buffers in elements 132, 134 and 136 to the shared device 138 of multiported device 100.

Figure 3:
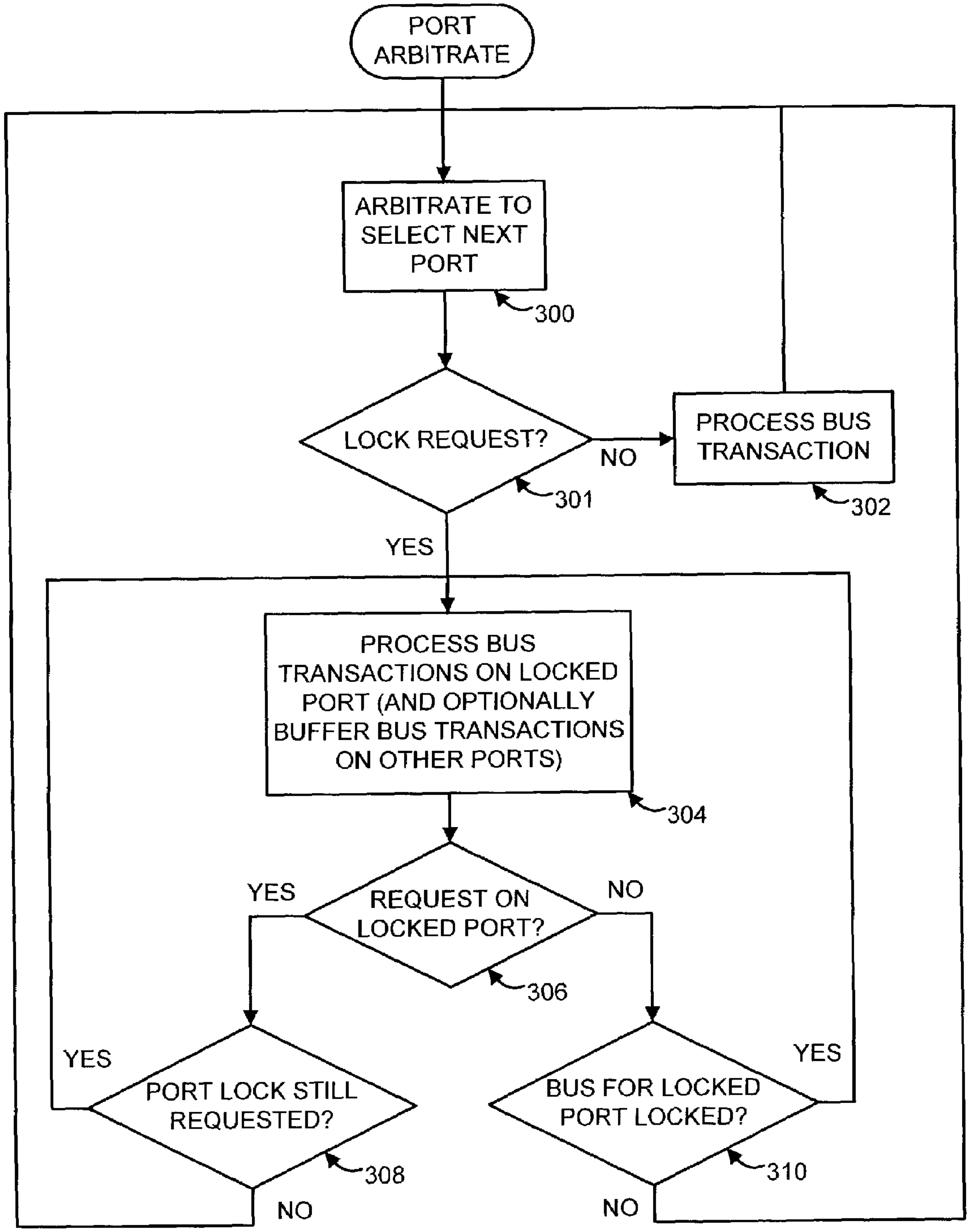
FIG. 3 is a flowchart describing operation of an arbiter enhanced in accordance with the present invention.

FIG. 3 is a flowchart describing general operation of the lock preservation features of the present invention coupled with standard bus transaction arbitration. The lock preservation features of the present invention may be physically integrated within a port arbiter circuit portion of a multiported device. Operation of the lock preservation features in a preferred exemplary embodiment is closely coupled with operation of the port arbiter to receive and process bus requests from master devices on the various buses coupled to the multiported device through one of its port interface. As noted above, each port of the multiported device presents bus requests for access to the shared device. Some such requests may include lock requests to lock device's access to the shared device through a series of bus transactions. The port arbiter of the multiported device therefore avoids selection of another port while a first port is in the midst of processing a sequence of locked bus transactions on behalf of one of the master devices associated with the first port.

Element 300 of FIG. 3 represents port arbitration processing within the multiported device to select a port on which the associated bus is requesting access generated by some master device coupled to that bus. Port arbitration may use any of several widely known arbitration techniques analogous to those used in standard bus arbitration including, for example, round-robin selection, priority based selection, combinations of round-robin and priority selections, etc.

The bus and associated master devices coupled to the selected port are thereby granted temporary exclusive access to the shared device aspects of the multiported device (i.e., memory control features, bus bridge features, etc.). Element 301 then determines whether the request associated with the selected port also is requesting a lock for an intended sequence of related bus transactions. If not, element 302 is operable to process the single bus transaction requested by a device on the bus associated with the selected port and processing continues by looping back to element 300 to select a next port. If the device is requesting a lock of the bus (and hence the port) as determined by element 301, element 304 is operable to process one or more bus transactions requested by the device and bus coupled to the selected port. As noted above, read-modify-write transactions are common examples of such a sequence of bus transactions that are intended to be performed as an atomic, uninterrupted sequence with the slave device.

In addition, as discussed further herein below, other ports will optionally buffer any bus transactions received on their corresponding buses while a sequence of locked bus transactions are processed on the presently selected (locked) port. Element 304 therefore optionally buffers any bus transactions presented to ports other than the presently selected, locked port. As noted above, a typical implementation would simply block recognition and grant of any further bus requests on buses of other ports once a first master device on a first bus coupled to the selected port of the multiported device locks access to the device. With the optional buffering feature of element 304, further bus requests on other ports of the multiported device may be processed, completed and buffered within the command buffer of the corresponding port while a first bus on a first port has the multiported device locked on that first port.

Elements 306, 308 and 310 then monitor signals on the various buses and ports associated with the multiported device to detect when the granted lock is released by the requesting master device on the bus coupled to the selected (locked) port. Depending on the architecture of the buses in a particular application of the present invention, detection of the release of a lock may be performed by sensing a signal directly indicating the release of a lock or may be accomplished by sensing other signals on the buses and the ports of the multiported device to heuristically determine the end of the locked sequence of transactions. In an exemplary preferred embodiment, the release of a lock on an AMBA AHB compliant bus is indicated by signals applied to the ports of the multiported slave device by bus interface and command buffer elements 114, 116 and 118 (i.e., signals on paths 134, 136 and 138 of FIG. 1) and signals applied directly to the bus (124, 126 and 128) by master devices coupled thereto. Sensing the level of the lock request signal on the port and/or the bus along with the state of the bus request signal at the port interface determines whether the lock is still active or has been released.

In particular, element 306 determines whether there remains a bus request signal asserted on the port interface of the locked port of the multiported device. If so, element 308 then determines whether the port's lock request signal is still asserted. If so, the locked sequence of bus transactions is continuing and the locked port is not yet released. Processing continues with element 304 to (optionally) continue buffering blocked bus transactions. If element 308 determines that the lock request on the locked port of the multiported device is no longer asserted, the lock has been released and processing continues at element 300 to continue normal arbitration processing for any outstanding bus requests on any of the ports of the multiported device.

If element 306 determines that there is no bus request on the presently locked port, element 310 is next operable to determine whether the lock request for the locked port remains asserted on the bus associated with the locked port. If the bus continues to assert the lock request signal, processing continues with element 304 to (optionally) buffer blocked transactions. If the bus associated with the locked port is no longer asserting the lock request signal and the port is not presently requesting the bus, then the lock has been released and processing continues at element 300 with normal arbitration processing of any bus requests from any master device on any bus associated with any port of the multiported device.

Those skilled in the art will recognize a variety of equivalent methods and processes for preserving lock requests from multiple buses sharing a common multiported device. FIG. 3 is therefore intended as describing one exemplary preferred embodiment of a method of the present invention.

Figure 2:
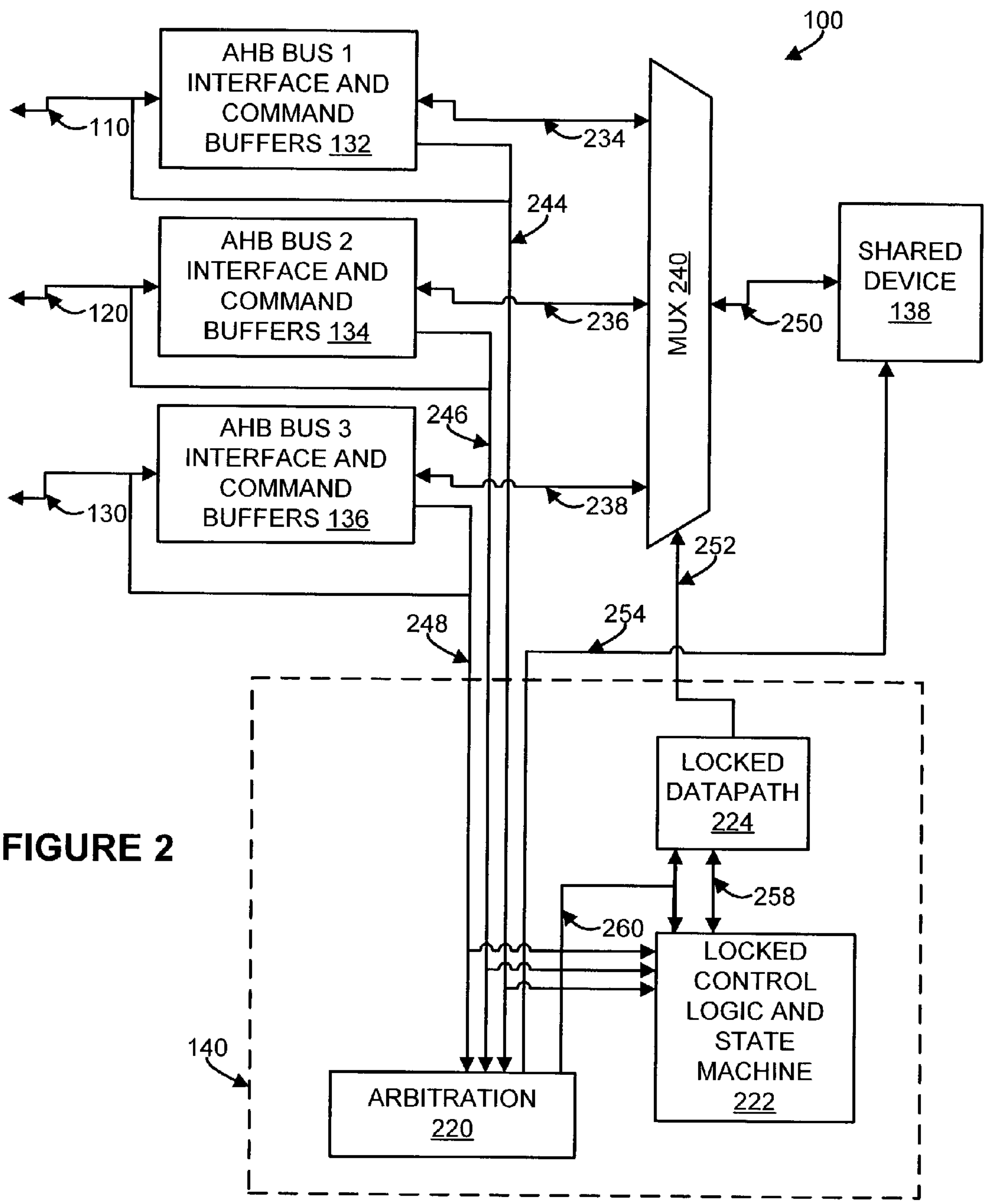
FIG. 2 is a block diagram of the system of FIG. 1 providing additional details of features of the present invention.

FIG. 2 is a diagram of an exemplary preferred embodiment of the lock preservation features of the present invention. FIG. 2 provides some additional detail as to the structure of the enhanced features of the present invention operable within a multiported device. In the specific exemplary preferred embodiment depicted in FIG. 2, three AMBA AHB buses (110, 120 and 130) share access to shared device 138. As noted above, AHB buses may include: AHB, AHB-Lite and Multilayer AHB bus structures. Further as noted above, shared device 138 may be a bus bridge device coupling the AHB buses to yet another bus structure, or shared device 138 may be a multiported slave device, or shared device 138 may be a multiported memory controller slave component coupling the AHB buses to a memory subsystem (not shown).

When a device on AHB bus 1 (110) is interacting with shared device 138, appropriate command, status and data signals are exchanged through AHB bus interface 132 via path 234 through multiplexer 240 and path 250 to shared device 138. In like manner, when a device on AHB bus 2 (120) interfaces with shared device 138, command, status and associated data are exchanged through AHB bus interface 134 via path 236 and 250 through multiplexer 240. Similarly signals on AHB bus (130) are exchanged with shared device 138 through AHB bus interface 136 over buses 238 and 250 through multiplexer 240.

Port arbiter with lock preservation 140 (of FIG. 1) is shown as dashed lines in FIG. 2 with additional details of functional elements forming aspects of its operation. When a device on AHB bus 1 (110) requests locked access to shared device 138, a signal is asserted on bus 110 and passed through bus 244 to port arbitration logic 220 and lock control logic 222 for further processing. Similarly, a lock request on AHB bus 2 (120) is passed through bus 246 to port arbitration logic 220 and lock control logic 222. Likewise, a lock request on AHB bus 3 (130) is also applied through bus 248 to port arbitration logic 220 and lock control logic 222.

All requests for access to the shared device 138 by any devices on any of the AHB buses (110, 120 and 130) are processed by port arbitration logic 220 to select a port (and corresponding bus and device) to be temporarily, logically coupled through multiplexer 240 to shared device 138. The port so selected by port arbitration logic 220 is applied to path 260 for application to lock control logic 222 and lock datapath logic 223. Lock datapath logic 223 in turn supplies an appropriate selection signal to multiplexer 240 via path 252.

When a lock request is detected from any of the buses by port arbitration logic 220 and lock control logic 222, lock control logic 222 is operable in accordance with a state machine to grant such a lock request and monitor processing of the locked transactions to determine when the lock is released. When lock control logic 222 determines that a lock will be granted, appropriate signals are applied via path 258 to lock datapath logic 223 to enable lock datapath logic 223 to lock its selection signal applied to multiplexer 240 via path 252. When a selected port is so locked, lock datapath logic 223 applies an appropriate signal indicating the locked port to lock control logic 222 via path 258.

Figure 5:
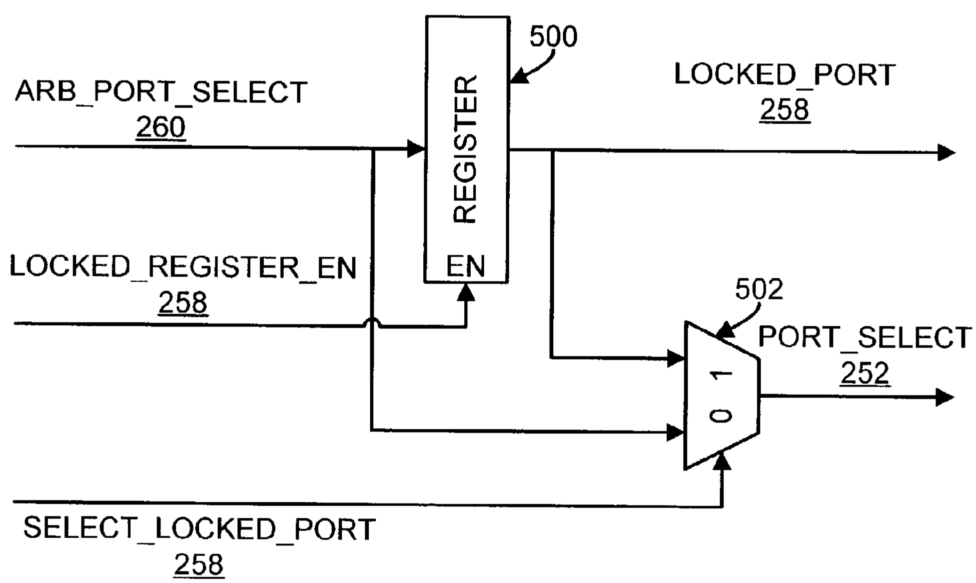
FIG. 5 is a circuit diagram of a portion of an arbiter enhanced in accordance with the present invention to store the port number of a multiported device that is to be locked on a particular port.

FIG. 5 is a block diagram providing additional details of an exemplary preferred embodiment for implementation of locked data path element 224 of FIG. 2. In general as discussed above, locked data path element 224 is responsible for generating a selection signal indicating the presently selected port for application to multiplexer 240 of FIG. 2. Further, locked data path element 224 returns a signal to lock control logic and state machine 222 indicating that a particular port (bus) has successfully locked access to the multiported shared device. Inputs to locked data path element 224 are received from port arbitration element 220 via path 260 and from lock control logic and state machine 222 via path 258 as shown in FIG. 2.

In particular, the port or bus ID (ARB_PORT_SELECT) selected by port arbitration element 220 of FIG. 2 is applied via path 260 as an input to register 500 of FIG. 5. A LOCKED_REGISTER_EN (enable) signal generated by the state machine of element 222 provides an enable signal to register the presently selected port or bus ID as indicated by the arbitration element. The presently registered selected port is applied as an output of register 500 (LOCKED_PORT) on path 258 for return to the lock control logic and state machine and is also applied as a first input to multiplexer 502 of FIG. 5. The second input of multiplexer 502 is the presently selected bus or port ID (ARB_PORT_SELECT) as indicated by the arbitration element on path 260.

A selection signal (SELECT_LOCKED_PORT) generated from lock control logic and state machine 222 is applied via path 258 as a selection input signal to multiplexer 502 to select either the presently locked port or bus ID (LOCKED_PORT) or the presently selected port ID from the arbitration element (ARB_PORT_SELECT) for application to the output path 252 of multiplexer 502. Those of ordinary skill in the art will recognize a variety of equivalent circuit embodiments for providing signals indicating a presently selected bus or port ID for application to the multiplexer 240 and for registering the presently locked port ID as indicated by the signal on path 258.

Figure 6:
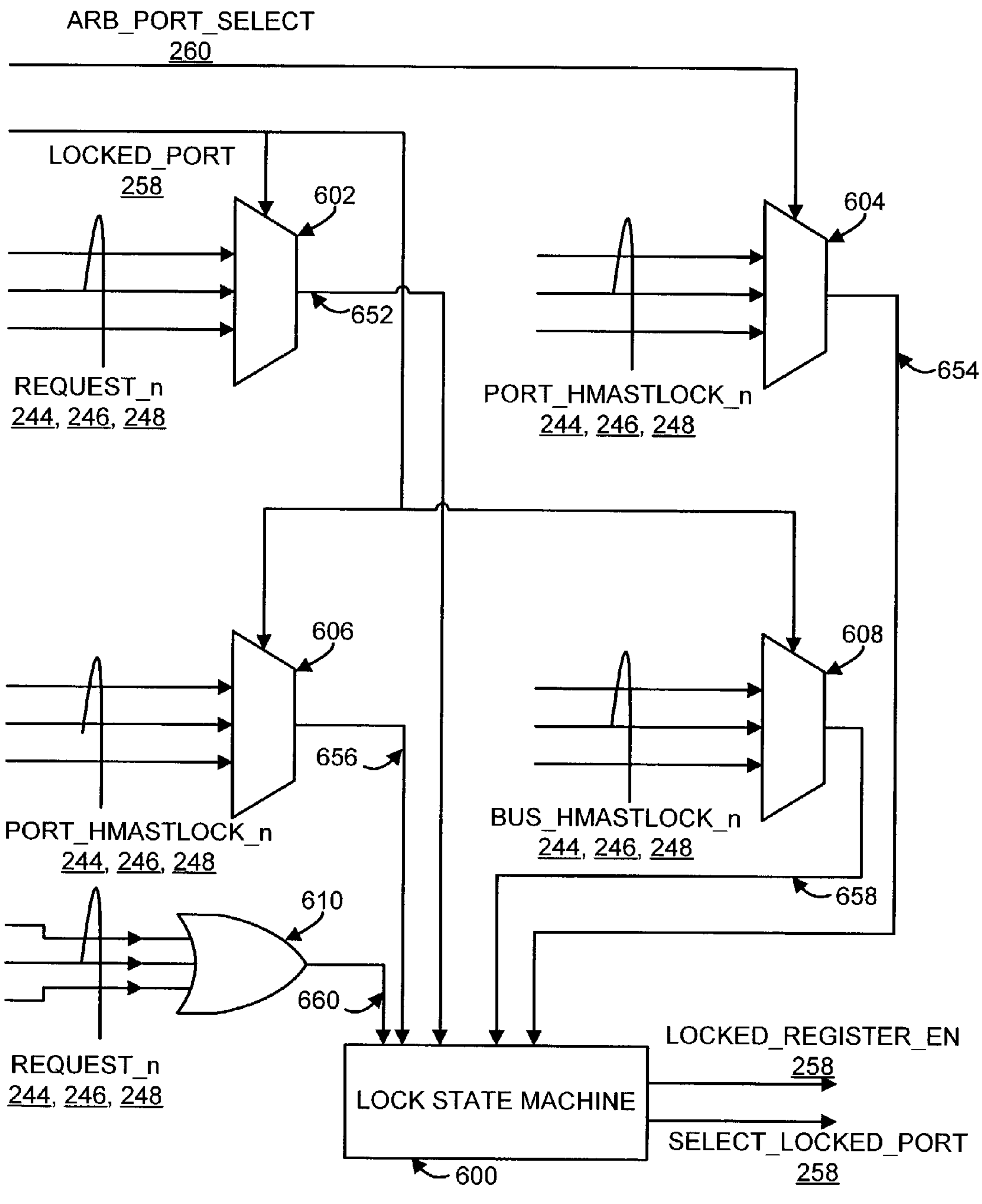
FIG. 6 is a circuit diagram of a portion of an arbiter enhanced in accordance with the present invention to provide inputs to the state machine controlling operation of the lock grant enhancements according to the present invention.

FIG. 6 is a block diagram of an exemplary preferred embodiment of the lock control logic and state machine of element 222. The circuits of FIG. 6 generally implement the methods depicted in FIG. 3 to grant a lock request and to determine when the granted lock has been released. In particular, the presently selected port as indicated by the arbitration element (ARB_PORT_SELECT) is applied to path 260 and the presently locked port ID (LOCKED_PORT), if any, is applied to path 258. In essence, the locked port ID and the presently selected port signals are used as selection inputs to multiplexers to apply appropriate selected signals to state machine 600. State machine 600, in turn, generates signals to enable the registering of a port ID to be locked (as described above in FIG. 5) and the identify the port to be locked. Conversely, according to the inputs applied, state machine 600 also disables the registering of the locked port ID thereby releasing the previously granted lock.

The port ID presently selected by the arbitration element (ARB_PORT_SELECT) applied to path 260 his used as an input signal applied to multiplexer 604. Multiplexer 604 thereby selects one of its multiple inputs corresponding to the presence of a PORT_HMASTLOCK signal presently asserted on the port selected by the arbiter. The output of multiplexer 604 is applied to path 654 as an input to the state machine and indicates that a port, presently selected by the arbitration element, has a PORT_HMASTLOCK signal presently active. This lock may be granted by the state machine 600 if there is no other presently locked port. If there is a presently locked port, this lock request will not be granted until such later time as there is no presently locked port and the port selected by the arbiter is again (or still) requesting a lock.

The locked port signal (LOCKED_PORT) applied to path 258 is used as a selection input to multiplexers 602, 606 and 608. The locked port signal indicates the port ID of the port, if any, for which a lock is presently active.

Multiplexer 602 uses the locked port ID as a selection input to select one of its multiple input paths, each indicating a command request (REQUEST) on the corresponding port. The output of multiplexer 602 applied to path 652 therefore indicates that there is a bus command request pending on the port for which a lock is presently active. A command request indicates that another command is queued (or buffered) on the selected port ID.

Multiplexer 606 uses the locked port ID on path 258 as a selection input to select one of its multiple input signals. The input signals applied to multiplexer 606 (PORT_HMASTLOCK) indicate each that there is a presently active lock on the corresponding port. The output of multiplexer 606 applied to path 656 therefore indicates that there is a presently active lock on the presently locked port—i.e., the port interface is still requesting a lock for its transactions.

Multiplexer 608 uses the locked port ID on path 258 as its selection input to select one of its multiple input paths. The inputs to multiplexer 608 (BUS_HMASTLOCK) each indicate that a lock is presently active on the corresponding bus. The output of multiplexer 608 applied to path 658 therefore indicates that the bus corresponding to the presently locked port is still requesting a lock of the device is still requesting the lock.

The output of multiplexer 606 therefore indicates that the locked port is still requesting the lock as distinct from the corresponding bus. The output of multiplexer 608, by contrast, indicates that the bus corresponding to the locked port is still requesting the lock. The signals may be different depending on the degree of buffering within the bus interface and command buffer elements described above. Where the port is directly coupled to the corresponding bus (i.e., no buffering of transactions) then the two signals should be equivalent.

Another input applied to state machine 600 is generated by the OR of the request signals (REQUEST) for all ports. OR gate 610 receives the request signal from each port and applies the logical OR of those request signals via path 660 to state machine 600.

Lock state machine 600 receives the above inputs and determines the port ID, if any, to be locked and determines if the presently locked port (if any) has released its lock. If the port presently selected by the arbitration element is to be locked, a signal (SELECT_LOCKED_PORT) is applied to path 258. A signal (LOCKED_REGISTER_EN) is generated by state machine 600 and applied to path 258 to enable loading the register in locked data path element 224 discussed above.

Those skilled in the art will recognize a variety of equivalent circuit structures for control of the lock requests generated by devices on the multiple buses. FIG. 6 is therefore intended merely as representative of all such equivalent circuit structures.

Figure 4:
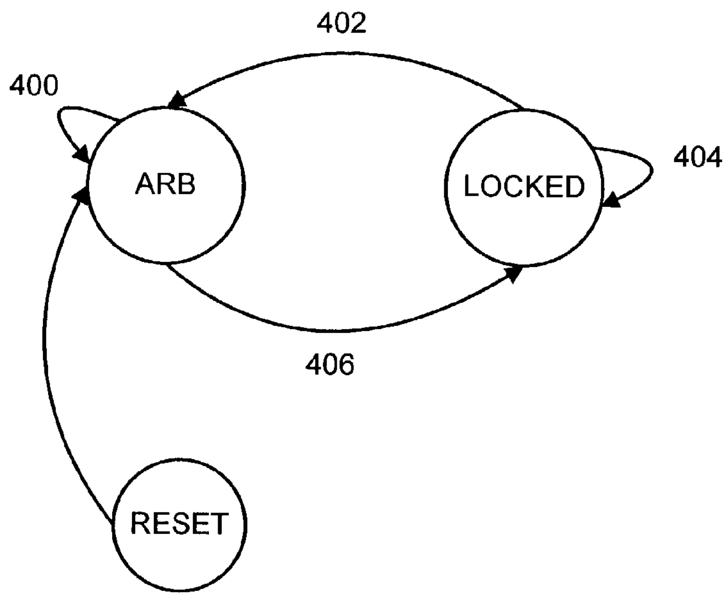
FIG. 4 depicts a state machine that describes operation of the port arbiter enhanced in accordance with the present invention.

State machine 600 of FIG. 6 preferably operates as a state machine receiving the various inputs described above and determining and next state transition to be made. FIG. 4 graphically depicts the state machine for a preferred exemplary embodiment of the present invention. The following hardware description language (HDL) excerpts present processing of the state machine that determines when a lock request may be granted or when a lock request must be reserved for future processing. The transitions indicated by reference numbers in FIG. 4 correspond to commentary below indicating the HDL structure associated with each transition. Further, the output generated at each state in FIG. 4 is indicated by appropriate commentary for the corresponding HDL structure generating outputs for the state machine.

```
STATE TRANSITION 400:
// This transition is taken until a locked transaction is
// written to the shared resource (multiported device)
(state = ARB) & (!REQUEST | !SELECTED_PORT_HASTLOCK |
!COMMAND_WRITE)
STATE TRANSITION 406:
// This transition is taken when a locked transaction is
// written to the shared resource (multiported device)
(state = ARB) & (REQUEST & SELECTED_PORT_HMASTLOCK &
COMMAND_WRITE)
STATE TRANSITION 404:
// This transition is taken when either a locked command is
// next in line -or- the bus is not locked and there are no
// pending transaction requests
(state = LOCKED) & ((!LOCKED_REQUEST &
LOCKED_BUS_HMASTLOCK) |
(REQUEST & SELECTED_PORT_HMASTLOCK &
COMMAND_WRITE) |
(LOCKED_REQUEST & LOCKED_HMASTLOCK))
STATE TRANSITION 402:
// This transition is taken when either a non-locked
command is
// next in line -or- the bus is not locked and there are no
// pending transaction requests
(state = LOCKED) & !((!LOCKED_REQUEST &
LOCKED_BUS_HMASTLOCK) |
(REQUEST & SELECTED_PORT_HMASTLOCK &
COMMAND_WRITE) |
(LOCKED_REQUEST & LOCKED_HMASTLOCK))
OUTPUT AT STATE ARB:
LOCKED_REGISTER_EN = SELECTED_PORT HMASTLOCK
```

-continued

```
SELECT_LOCKED_PORT = 0
OUTPUT AT STATE LOCKED:
LOCKED_REGISTER_EN = COMMAND_WRITE &
    (!(LOCKED_REQUEST & LOCKED_HMASTLOCK) &
    !(!LOCKED_REQUEST * LOCKED_BUS_HMASTLOCK) &
    SELECTED_PORT_HMASTLOCK)
SELECT_LOCKED_PORT =
    (LOCKED_REQUEST & LOCKED_HMASTLOCK) |
    (!LOCKED_REQUEST & LOCKED_BUS_HMASTLOCK)
```

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. An enhanced port arbitration circuit associated with a multiported slave device coupled to a plurality of multiple AMBA AHB compliant buses wherein each bus has at least one master device coupled thereto, the enhanced port arbitration circuit including:

a lock request detector for detecting a lock request from a master device on a first bus of said multiple AMBA AHB compliant buses coupled to a first port of said multiported slave device wherein said lock request is detected as a transaction on said first bus and is requesting temporary exclusive access to said first bus for the duration of a sequence of subsequent bus transactions on said first bus and until a release of the lock request is detected; and a lock preserver coupled to said lock request detector for preserving said lock request with respect to other ports of said multiported slave device.

2. The circuit of claim 1 wherein said lock preserver includes:

a state machine operable to control arbitration among said other ports in accordance with the preserved lock request on said first port.

3. The circuit of claim 2 wherein said state machine is operable to prevent arbitration on said other ports while the preserved lock request remains active and wherein said state machine is operable to allow arbitration among said other ports when the preserved lock request in no longer active.

4. The circuit of claim 1 wherein said multiported slave device is a memory controller.

5. The circuit of claim 1 wherein said lock request detector includes:

a lock request signal detector for detecting a lock request signal generated by said master device.

* * * * *